(12) United States Patent
Bryant et al.

(10) Patent No.: US 10,079,824 B2
(45) Date of Patent: Sep. 18, 2018

(54) TRANSACTION QUERY ENGINE

(71) Applicant: Hitachi Data Systems Corporation, Santa Clara, CA (US)

(72) Inventors: Alan G. Bryant, East Walpole, MA (US); Nathan W. Clark, Millbury, MA (US); Richard D. Bramante, Jr., Methuen, MA (US)

(73) Assignee: HITACHI VANTARA CORPORATION, Santa Clara, CA (US)

( * ) Notice: Subject to any disclaimer, the term of this patent is extended or adjusted under 35 U.S.C. 154(b) by 244 days.

(21) Appl. No.: 14/915,423

(22) PCT Filed: Dec. 17, 2013

(86) PCT No.: PCT/US2013/075855
§ 371 (c)(1),
(2) Date: Feb. 29, 2016

(87) PCT Pub. No.: WO2015/094195
PCT Pub. Date: Jun. 25, 2015

(65) Prior Publication Data
US 2016/0212120 A1    Jul. 21, 2016

(51) Int. Cl.
*G06F 15/16* (2006.01)
*H04L 29/06* (2006.01)
(Continued)

(52) U.S. Cl.
CPC .......... *H04L 63/083* (2013.01); *G06F 17/277* (2013.01); *G06F 17/30174* (2013.01); *G06F 17/30227* (2013.01); *G06F 21/6218* (2013.01)

(58) Field of Classification Search
CPC ................. H04L 63/083; G06F 17/277; G06F 17/30174; G06F 17/30227
(Continued)

(56) References Cited

U.S. PATENT DOCUMENTS 6,898,633 B1 *  5/2005  Lyndersay .............. H04L 63/08
                                                           709/217
7,222,132 B2    5/2007  Tormasov et al.
(Continued)

FOREIGN PATENT DOCUMENTS

WO         2013178528 A1      12/2013

OTHER PUBLICATIONS

Extended Search Report for European Application No. 13899841.1 dated Mar. 17, 2017, 7 pages. European Patent Office, Munich, Germany.
(Continued)

*Primary Examiner* — Alan S Chou
(74) *Attorney, Agent, or Firm* — Procopio, Cory, Hargreaves & Savitch LLP (57) ABSTRACT

Example implementations described herein are directed to a transaction query engine involving a token that is generated by the server and sent to the corresponding the client. The client uses the token to query transactions made on the server. The token can include mountpoint information detailing shared and private information of the filesystems, transaction identifiers identifying transactions of a filesystem, and a filesystem identifier to identify the corresponding filesystem. The server processes this token and updates the token based on the transaction information of the filesystem, and sends the token back to the corresponding client.

10 Claims, 10 Drawing Sheets

(51) Int. Cl.
*G06F 17/30* (2006.01)
*G06F 17/27* (2006.01)
*G06F 21/62* (2013.01)

(58) Field of Classification Search
USPC ........................................................ 709/248
See application file for complete search history.

(56) References Cited

U.S. PATENT DOCUMENTS

| | | |
|---|---|---|
| 2004/0015724 A1* | 1/2004 | Pham .................... H04L 63/102 713/179 |
| 2011/0016085 A1 | 1/2011 | Kuo et al. |
| 2013/0132463 A1 | 5/2013 | Garcia-Ascanio et al. |
| 2013/0304705 A1 | 11/2013 | Wong |

OTHER PUBLICATIONS

International Search Report and Written Opinion for PCT Application No. PCT/US13/75855 dated May 23, 2014, 8 pgs.

* cited by examiner

Logical view

| |
|---|
| 9 Create Folder3 |
| 10 Create mark.txt |
| 11 Create mountpoint Shared Folder1 |
| 12 Create /SharedFolder1/ark.txt (from FS3-Xlog) |
| 13 Create /SharedFolder1/bark.txt (from FS3-Xlog) |

FIG. 2B

"Example of token created by the server"
{ token: "{\"resources\":[{f:1234,m:/,i:5},{f:8888,m:/SharedFolder1, i:0}]}"}

FIG. 3A

Logical view

| | |
|---|---|
| 1 | Create Folder1 |
| 2 | Create Folder2 |
| 3 | Create foo.txt |
| 4 | Create bar.txt |
| 5 | Create foobar.txt |
| 11 | Create mountpoint SharedFolder1 |
| 12 | Create /SharedFolder1/ark.txt (from FS3-Xlog) |
| 13 | Create /SharedFolder1/bark.txt (from FS3-Xlog) |
| | |
| | |

TRANSACTION QUERY ENGINE

The present application is a National Stage entry of PCT/US2013/075855, filed on Dec. 17, 2013, the contents of which are incorporated herein by reference in their entirety for all purposes.

BACKGROUND

Field

The present disclosure is generally related to a server/client architecture and more specifically, for a transaction query engine.

Related Art

Synchronization techniques are utilized in the related art to synchronize the clients and the server. In the related art, there is a synchronization mechanism between a web online version file and a client file. In this related art implementation, a remote source sends a notification (e.g, a web online version of a file was created, modified, and/or deleted) to the sync module. The sync module provide sync information to the client application, and the client application perform synchronization between the web online version file and client file.

In distributed architectures, synchronizing changes between a server and one or more clients while keeping the clients lightweight can be problematic. In particular, the synchronization can be problematic when clients need to handle synchronizing changes made by multiple users to the contents of a shared folder.

SUMMARY

Aspects of the present disclosure may include a server, which may include a memory configured to manage transaction information of a filesystem; and a processor, configured to process a token comprising transaction identifier information and mountpoint information; update the token from the transaction information based on the transaction identifier information and the mountpoint information; and send the token to a corresponding client.

Additional aspects may also include a method for a server, which can include managing transaction information of a filesystem; processing a token comprising transaction identifier information and mountpoint information; updating the token from the transaction information based on the transaction identifier information and the mountpoint information; and sending the token to a corresponding client.

Additional aspects may also include a non-transitory computer readable storage medium storing instructions, which can include managing transaction information of a filesystem; processing a token comprising transaction identifier information and mountpoint information; updating the token from the transaction information based on the transaction identifier information and the mountpoint information; and sending the token to a corresponding client.

DETAILED DESCRIPTION OF DRAWINGS

The following detailed description provides further details of the figures and example implementations of the present disclosure. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. The implementations described herein are also not intended to be limiting, and can be implemented in various ways, depending on the desired implementation.

Example implementations are directed to a Transaction Query Engine (TQE) which not only provides the chronological listing of all the operations that occurred in a certain time period, but also has an astute implementation of mapping and resolving multiple filesystems to a single file system. Therefore a single transaction log can be utilized to be presented to the client. This reduces the complexity of the client and makes it simple. Example implementations of the TQE described herein can handle all data synchronization complexities, making the client simple and light.

Example implementations of the TQE use tokens to track the events from the file systems. The tokens are sent opaquely to the client and are used by the client in each representational state transfer (REST) application programming interface (API) request. The tokens allow the server to determine which events have already been delivered to the client as well as to determine the state of each individual filesystem. The tokens also contain information of the files path for shared folder mountpoints and pointers to the last event communicated for synchronization to the clients.

The entire token generation and management can be intelligently handled by the server. In example implementations, Clients include these tokens in their communication with the server. The server (TQE) resolves the shared filesystem mappings and provides relevant information to the client in a single transaction log.

By use of the example implementations, the TQE reduces client complexity by reducing the number of client requests made. In related art systems, the synchronization of shared folder contents requires multiple transaction logs be presented in response to multiple client requests. Example implementations may avoid this situation by presenting a single transaction log to the clients and by optimizing client connection resources.

Based on the desired implementation design of the present disclosure, each user is assigned a filesystem and each shared folder is assigned its own filesystem as well. The content of the shared folders can be viewed and modified by multiple users. Server stores a transaction log for each filesystem. Every event (e.g., create, delete, modify) for a filesystem has an entry in the transaction log for that filesystem and has a transaction id associated to the transaction. The transaction ID is generated by the server.

In related art systems, before the introduction of shared folders, a single request was made to the server to synchronize content between client and server. When clients made a request to the server, they passed a token to the server. This token has information on the filesystem ID and the last event (transaction ID) communicated by server to the client. However, in this approach client had to be intelligent to track the last received event and make the next request appropriately.

For example, a client may perform the following sets of operations:
Create a file "MM51.doc"
Create a directory "Upgrade"
Delete the file "MM51.doc"
Rename the directory "Upgrade" to "Release"
The directory structure at the end of the operations is illustrated in the table below:

| Name | Modified | Size |
|---|---|---|
| /Release | Moments ago | |

In the mentioned example, when a first client request is made, transaction ID 0 is provided by the client. Assume "create file MM51.doc" is the first event and is stored as transaction ID 10, "create directory Upgrade" as transaction ID 11, "delete file MM51.doc" as transaction ID 12, for renaming directory to Release, "create directory Release" as transaction ID 13, "delete directory Upgrade" as transaction ID 14 in the filesystem transaction log. For the next client request, transaction ID 14 will be provided which means requesting the server to provide details of all the events that occurred after transaction ID 14.

Now, if a new client is registered with the server and tries to synchronize data, server returns all the events (transaction ID 10 to 14) for the filesystem. In this related art example, there is only a single request with the filesystem ID for the user.

Request from the client includes the token with file system ID and transaction ID.

```
token
{
    "fileSystemId":5764607523336977921,
    "transactionId":0
}
```

The response of request (made with the above token) from the server includes events that occurred after transaction ID mentioned in the client request as indicated below.

```
"transactions":[
{
    "xid":10,
    "path":"/MM51.doc",
    "event":"CREATE",
},
{
    "xid":11,
    "path":"/Upgrade",
    "event":"CREATE",
},
{
    "xid":12,
    "path":"/MM51.doc",
    "event":"DELETE",
},
{
    "xid":13,
    "path":"/Release",
    "event":"CREATE",
}
{
    "xid":14,
    "path":"/Upgrade",
    "event":"DELETE",
} ]}
```

The token and detailed Hypertext Transfer Protocol (HTTP) response is illustrated below:

```
Token
{
        "fileSystemId":5764607523336977921,
        "transactionId":0
}
Response from the server:
    HTTP/1.1 200 OK
    Server: Apache-Coyote/1.1
    X-HCPAW-SUPPORTED-API-VERSIONS: 1.0.0
    X-HCPAW-API-VERSION: 1.0.0
    Content-Type: application/json
    Content-Length: 560
    Date: Mon, 29 Oct 2012 19:56:33 GMT
    {
        "transactions":[
    {
        "xid":10,
        "path":"/MM51.doc",
        "event":"CREATE",
        "size":74,
"hash":"14ff33afcd307ae69f2f2d2455b73df19007bb41a4a286355da8883
66908f00709cbe0e2e0493a1033b959f708f43478",
        "versionId":1,
        "type":"FILE"
    },
    {
        "xid":11,
        "path":"/Upgrade",
        "event":"CREATE",
```

```
        "versionId":2,
        "type":"DIRECTORY"
    },
    {
        "xid":12,
        "path":"/MM51.doc",
        "event":"DELETE",
        "size":74,
    "hash":"14ff33afcd307ae69f2f2d2455b73df19007bb41a4a286355da8883
66908f00709cbe0e2e0493a1033b959f708f43478",
        "versionId":1,
        "type":"FILE"
    },
    {
        "xid":13,
        "path":"/Release",
        "event":"CREATE",
        "versionId":2,
"type":"DIRECTORY"
    }
    {
        "xid":14,
        "path":"/Upgrade",
        "event":"DELETE",
        "versionId":2,
        "type":"DIRECTORY"
    } ] }
```

However, with the introduction of shared folders, the complexity increases. If the related art implementation is utilized, clients are forced to make multiple requests to the server to synchronize the data. For example, if a client has ten shared folders, the client will need to make 11 requests (user's filesystem+number of shared folders). The number of client requests in each synchronization attempt are increased significantly in this approach.

As an example, in addition to the operations above, if client becomes part of 2 shared folders "Share1" and "Share2", the directory structure may appear as follows:

| Name | Modified | Size |
| --- | --- | --- |
| /Release | Moments ago | |
| /Share1 | Moments ago | |
| /Share2 | Moments ago | |

In related art implementations, the client will have to make three separate calls to the server with three different filesystem IDs and then keep track of separate responses from each of those calls. This would require clients to track and manage more details and thus increases the client complexity.

In example implementations of the present application, the token is made opaque to the client and client is not required to parse the token. To make a request from server, client sends the token provided by the server and does not create the token. The token can include packaged information about client filesystems, such as file system identifiers which can be in the form of information such as metadata, event entries organized by transaction identifier and mount points along with the transaction IDs. Transaction IDs can be event entries organized by transaction identifier which can also be in the form of information such as metadata.

Example implementations of the TQE has built in intelligence to parse information in the token, ensure that the user has authorized access to the filesystem, and lay out the mappings of multiple shared filesystems (if any) to the individual user filesystems. After the TQE completes the mapping, event streams from multiple file systems are coalesced into a single event stream for the client. Therefore, the client is presented with a single transaction log for those filesystems composed of the transaction logs of the various shared folders mapped into the main filesystem.

The events of the main filesystem are returned before the events of the mounted filesystems. All events thereby occur in an independent manner, and can be safely processed by the client. This approach by the example implementation TQE also results in consistency over all client data for a user and ensures clients are a mirror image of the server.

For the directory structure with shared folders mentioned earlier, the client makes a single request with the token shown below. Clients keep the information about filesystem IDs either in memory or in a lite database on clients.

```
{token:
"{\"resources\":[{f:144115188084244481,m:/,i:0},{f:14411518808424444
82,m:/Share1,i:0},{f:144115188084244483,m:/Share2,i:0}]}" }"
}
```

Depending on the desired implementation, obfuscation of the token can be utilized to reduce the size of the cookie as the size can become very large with a large number of filesystems. The keys used in the example token stand for:
    f—Filesystem identifier (ID)
    m—Mountpoint
    i—XID (transaction ID)

As explained above the filesystem identifier is information which identifies the filesystem of the client. The mountpoint information can be used to indicate what information stored in the filesystem (e.g., folders, files, etc.) are information that is shared with other clients, and which is private information for the client. The transaction ID contains transaction identifier information which can include information uniquely identifying the transaction within the filesystem.

The response from the server also specifies the token that client is required to use for the next request.

```
"transactions": [
    {
    "isSharedFolder": false,
    "path": "/MM51.doc",
    "event": "CREATE",
    },
    {
    "isSharedFolder": false,
    "path": "/Upgrade",
    "event": "CREATE",
    },
    {
    "isSharedFolder": false,
    "path": "/MM51.doc",
    "event": "DELETE",
    },
    {
    "isSharedFolder": false,
    "path": "/Release",
    "event": "CREATE",
    },
```

-continued

```
    {
    "isSharedFolder": false,
    "path": "/Upgrade",
    "event": "DELETE",
    },
    {
    "isSharedFolder": true,
    "path": "/Share1",
    "event": "CREATE",
    },
    {
    "isSharedFolder": true,
    "path": "/Share2",
    "event": "CREATE",
    }, ],
{"token":
"{\"resources\":[{\"f\":144115188084244481,\"m\":\"/\",\"i\":10},{\"f\":1
44115188084244482,\"m\":\"/Share1\",\"i\":0},{\"f\":1441151880842444
83,\"m\":\"/Share2\",\"i\":0}]}" }"
```

The token and detailed HTTP response for the example implementation of TQE outlined below:

```
Token
    {"token":
"{\"resources\":[{\"f\":144115188084244481,\"m\":\"/\",\"i\":0},{\"f\":14
4115188084244482,\"m\":\"/Share1\",\"i\":0},{\"f\":144115188084244448
3,\"m\":\"/Share2\",\"i\":0}]}" "}
Response from the server:
    HTTP/1.1 200 OK
    Server: Apache-Coyote/1.1
    X-HCPAW-SUPPORTED-API-VERSIONS: 1.0.0,1.0.1,1.1.0
    X-HCPAW-API-VERSION: 1.1.0
    X-HCPAW-System-Id: cd896178-0711-4ab9-a145-edf067ea20b0
    Content-Type: application/json;charset=UTF-8
    Content-Length: 200
    Date: Fri, 26 Jul 2013 17:20:41 GMT
    { "transactions": [
        {
        "isSharedFolder": false,
        "path": "/MM51.doc",
        "event": "CREATE",
        "size": 1306,
        "hash":
"ef9e3cc6b43b6929b26b831c5dc8a2fdf91240922a1767c149a3106261bd4
b3e0a4080b627dc32d1dc2ba247efc0b969",
        "versionId": 2,
        "type": "FILE",
        "conflict": false
        },
        {
        "isSharedFolder": false,
        "path": "/Upgrade",
        "event": "CREATE",
        "versionId": 1,
        "type": "DIRECTORY",
        "conflict": false
        },
        {
        "isSharedFolder": false,
        "path": "/MM51.doc",
        "event": "DELETE",
        "size": 1306,
        "hash":
"ef9e3cc6b43b6929b26b831c5dc8a2fdf91240922a1767c149a3106261bd4
b3e0a4080b627dc32d1dc2ba247efc0b869",
        "versionId": 2,
        "type": "FILE",
        "conflict": false
        },
        {
        "isSharedFolder": false,
        "path": "/Release",
        "event": "CREATE",
        "versionId": 1,
        "type": "DIRECTORY",
        "conflict": false
```

```
},{
    "isSharedFolder": false,
    "path": "/Upgrade",
    "event": "DELETE",
    "versionId": 1,
    "type": "DIRECTORY",
    "conflict": false
},
{
    "isSharedFolder": true,
    "path": "/Share1",
    "event": "CREATE",
    "versionId": 1,
    "type": "DIRECTORY",
    "conflict": false
},
{
    "isSharedFolder": true,
    "path": "/Share2",
    "event": "CREATE",
    "versionId": 1,
    "type": "DIRECTORY",
    "conflict": false
},
],
    {"token":
"{\"resources\":[{\"f\":144115188084244481,\"m\":\"/\",\"i\":10},{\"f\":144115188084244482,\
"m\":\"/Share1\",\"i\":0},{\"f\":144115188084244483,\"m\":\"/Share2\",\"i\":0}]}" }"
```

In this example, the return token specifies that in the next client request, transaction ID 10 is provided for filesystem ID 144115188084244481, transaction ID 0 is provided for filesystem ID 144115188084244482 and transaction ID 0 is provided for filesystem ID 144115188084244483. The client does not have to interpret and manage these IDs in the token. Instead these tokens are totally opaque to client and the client passes this token for the next request.

Figure 1:
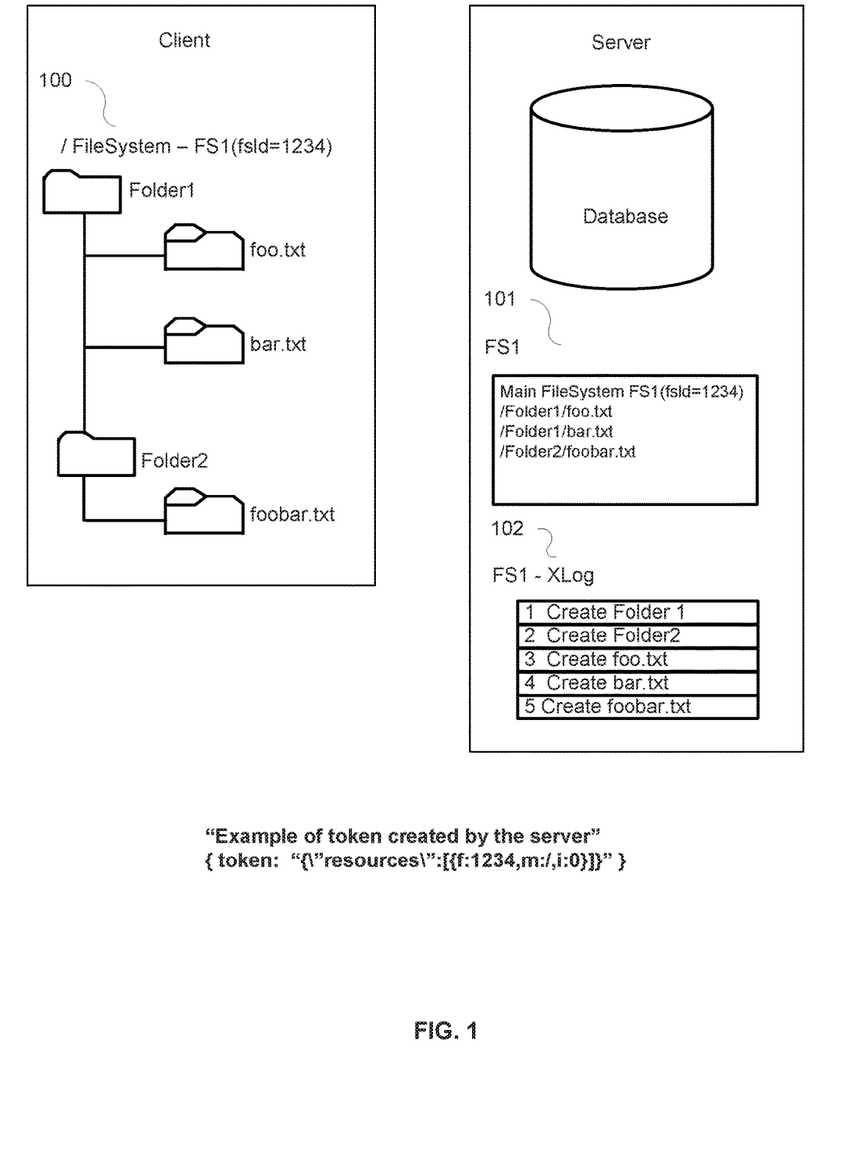
FIGS. 1, 2A, 2B, 3A and 3B illustrate example views of a file system (root,shared), transaction logs and event details, in accordance with an example implementation.
Figure 2A:
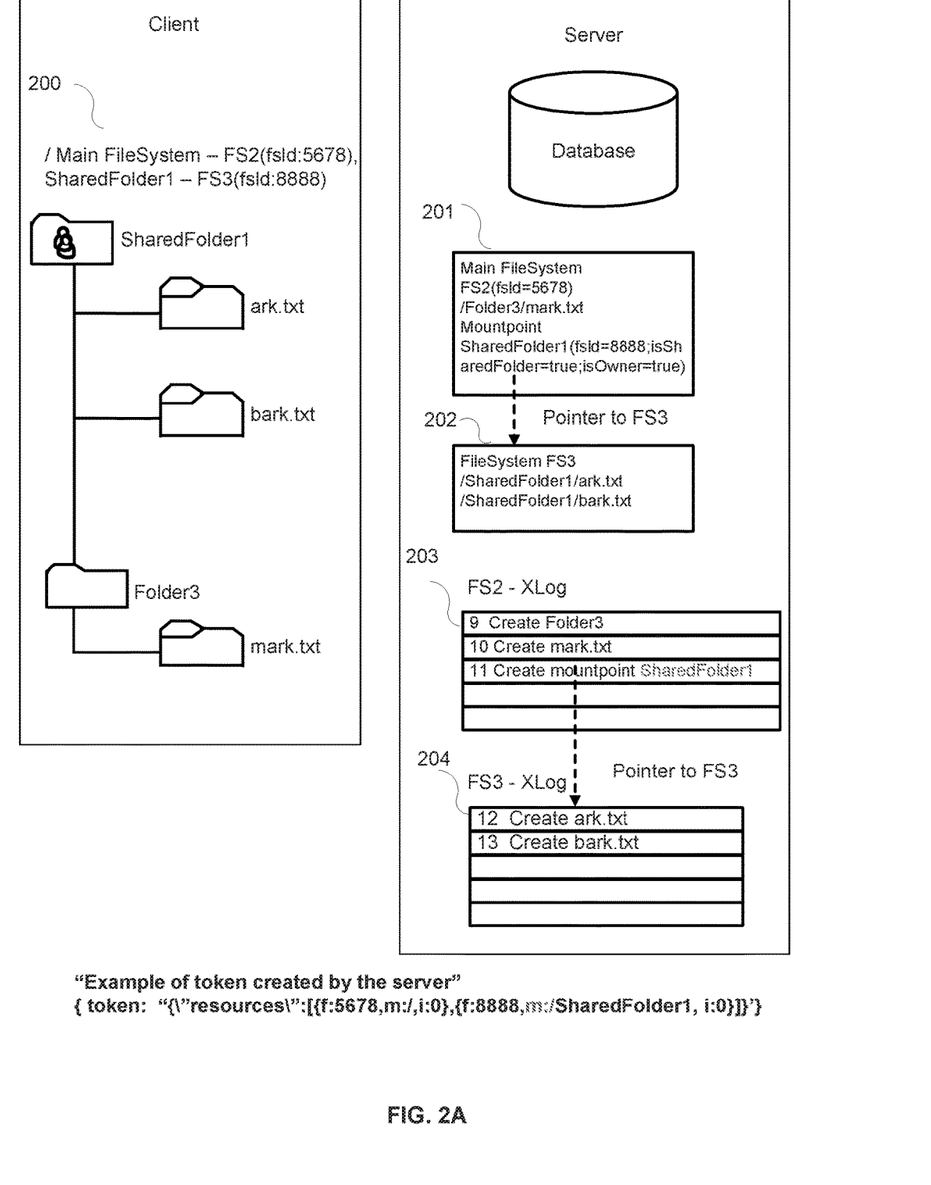
Figure 2B:
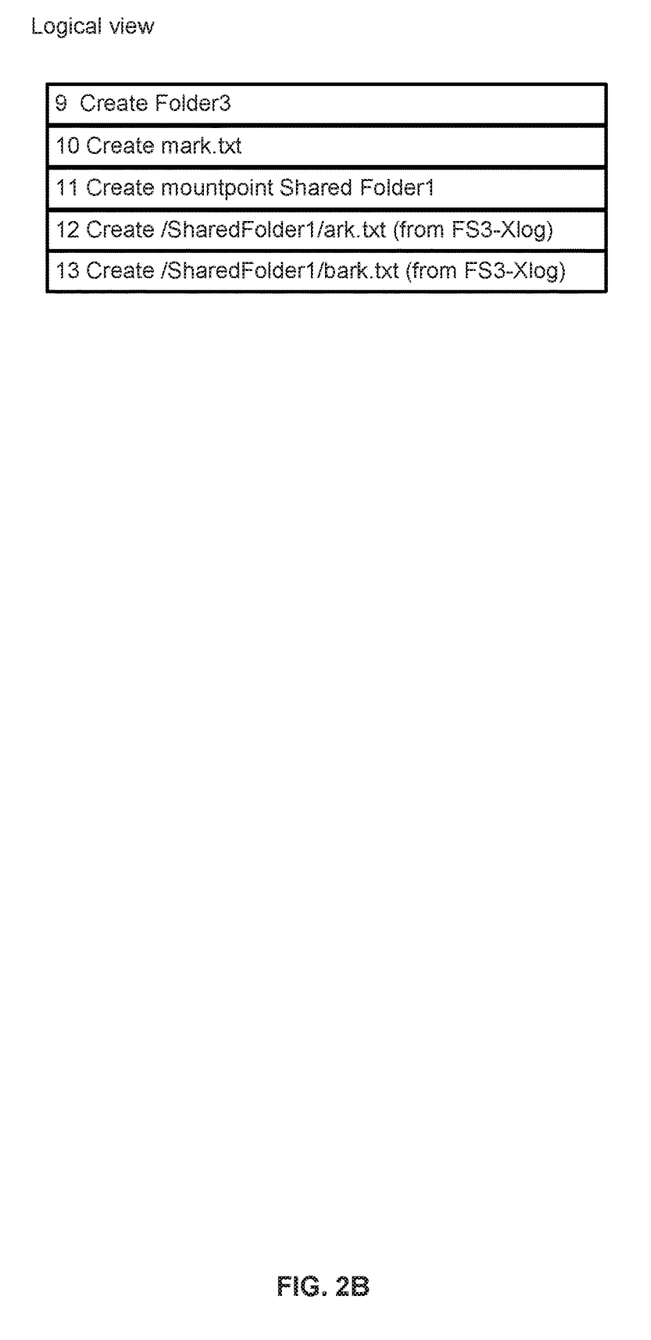
Figure 3A:
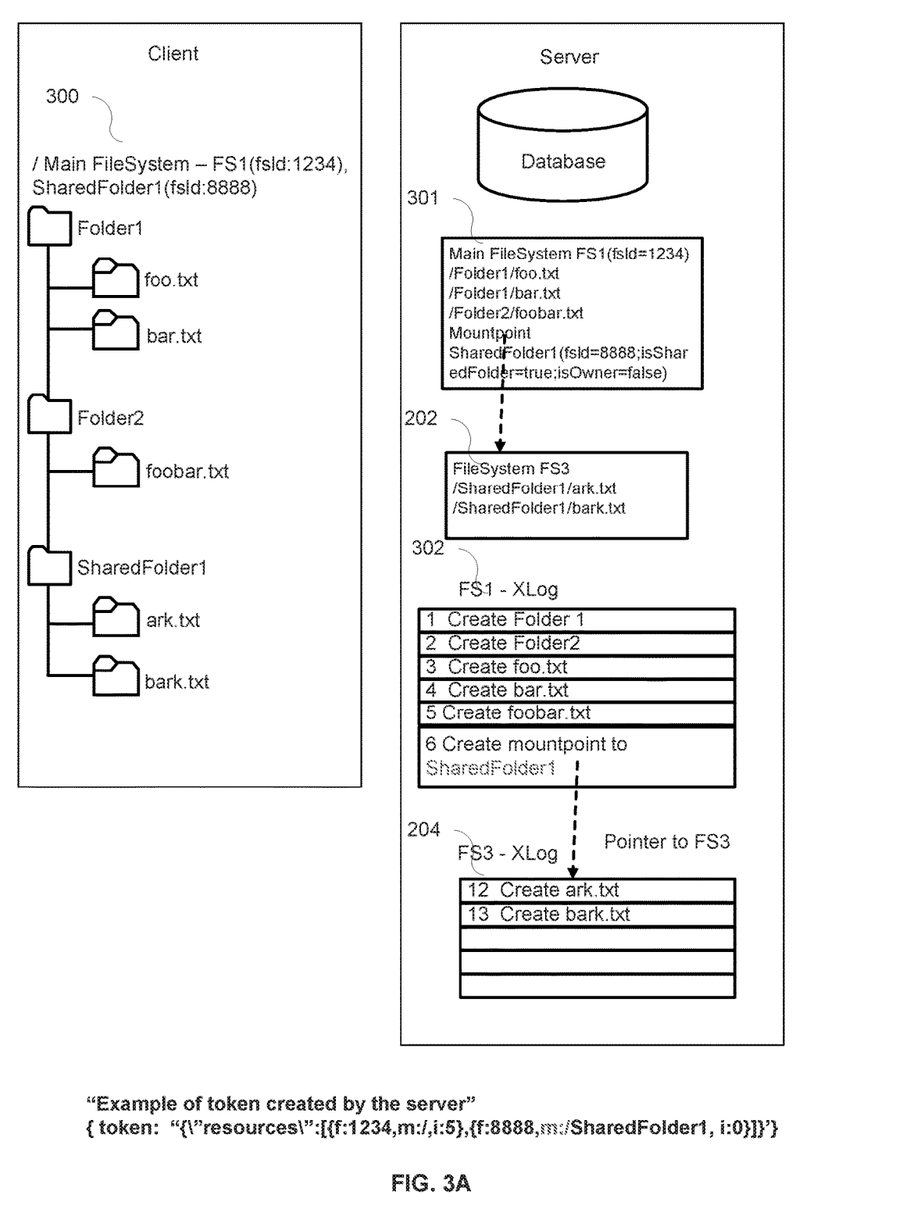
Figure 3B:
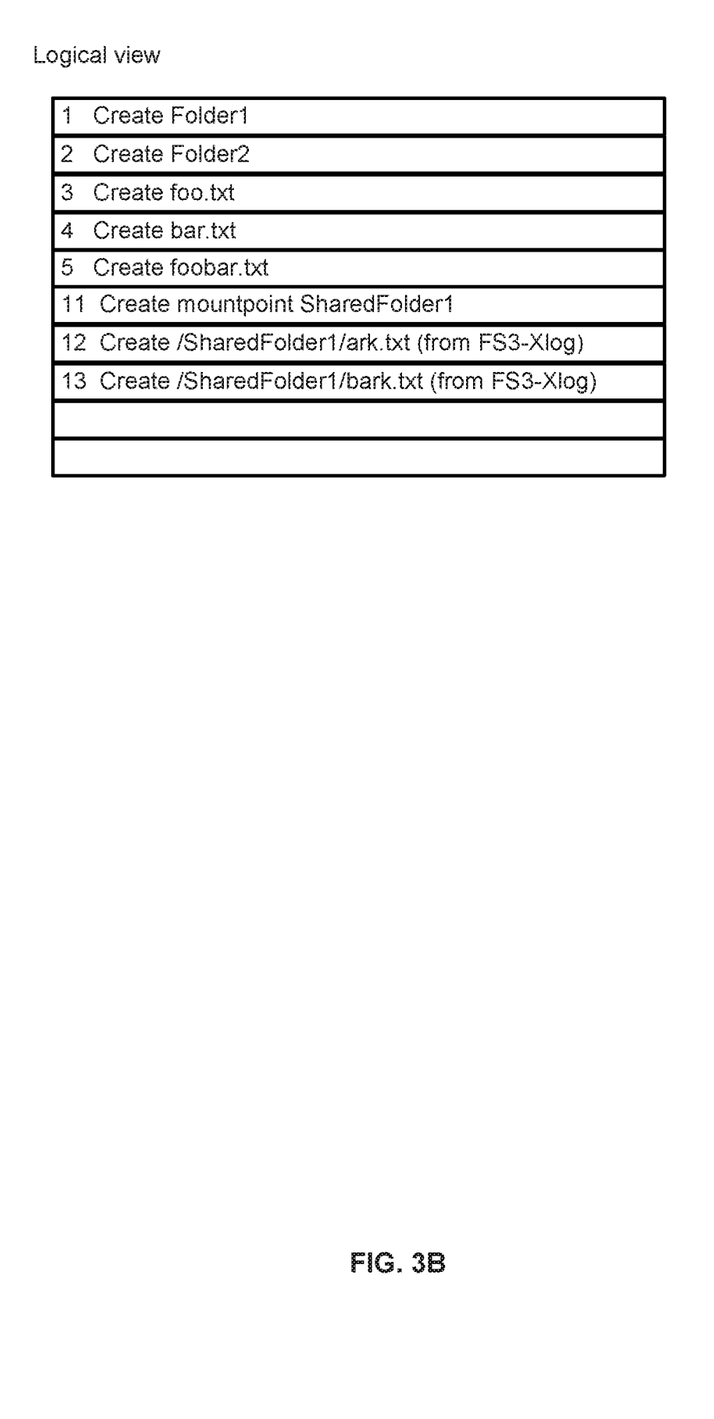

FIGS. 1 to 3 illustrates example views of a file system (root,shared), transaction logs and event details, in accordance with an example implementation. In the example scenario view illustrated in FIG. 1, User 1 registers a client and creates the directory structure 100 as illustrated. Transaction log FS1 for all events on the file system is stored in the database. Client's view is same as server view. On first client request, client receives all events (transaction ID 1 through 5).

In the example view illustrated in FIG. 2, User 2 registers a client and creates the directory structure 200 as illustrated. Transaction logs for all events for file system FS2 and FS3 are stored in the database. Mountpoint Shared Folder1 creation event and pointer to mountpoint Shared Folder1 (FS3) is also stored on FS2. Client's view is same as server view but client sees path like Shared Folder1/ark.txt whereas server just sees them as part of FS3. On first client request, client receives all events (transaction ID 9 through 13).

In the example view illustrated in FIG. 3 with directory structure 300, Shared Folder1 created by user 2 is shared with user 1. Client sees all events for Shared Folder2 on the next request (transaction ID 11 through 13). Client's view for shared folder's file path will be "/SharedFolder1/ark.txt,/SharedFolder1/bark.txt". The logical view as illustrated in FIG. 3 can provide for a logical view of the transactions of the filesystem. The logical view can include transactions related to shared information among clients of the filesystem (e.g., SharedFolder1) and private information for the client with the token (e.g., Folder1, Folder2). The transactions are consolidated into the logical view and can be used to update the token for mountpoints of the filesystem and for transactions across shared and private information.

Figure 4:
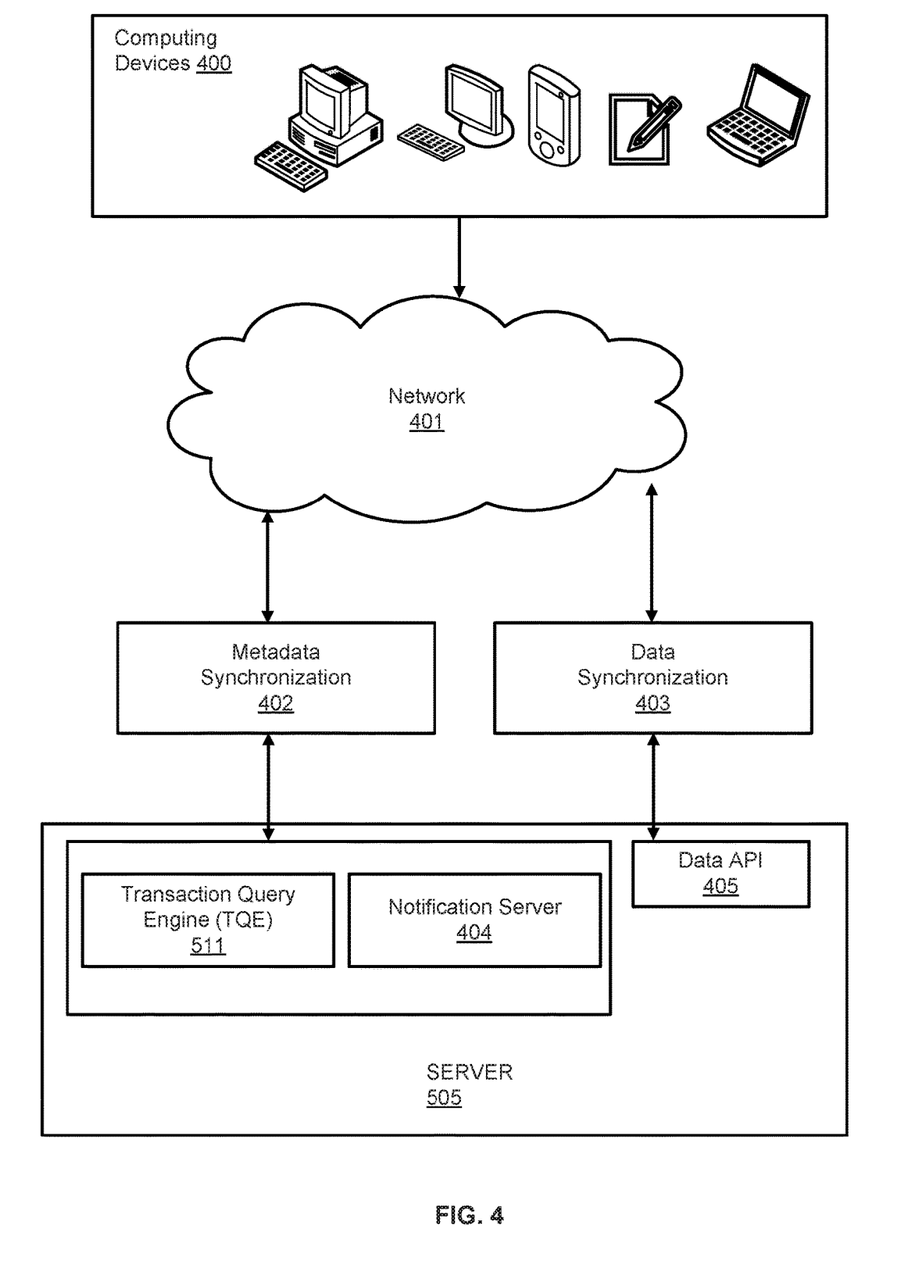
FIG. 4 illustrates a system architecture upon which example implementations may be implemented.

FIG. 4 illustrates a system architecture upon which example implementations may be implemented. The clients may be in the form of one or more computing devices 400 that interact with the server 505. Server may be configured with a Data API 405 to process data synchronization 403. Note that the Notification Server 404 can be implemented as a mechanism that the clients use to discover that there are changes available via TQE, in accordance with any implementation known in the art. The clients could use a variety of mechanisms to discover the existence of available changes, including simply polling TQE periodically.

Figure 5:
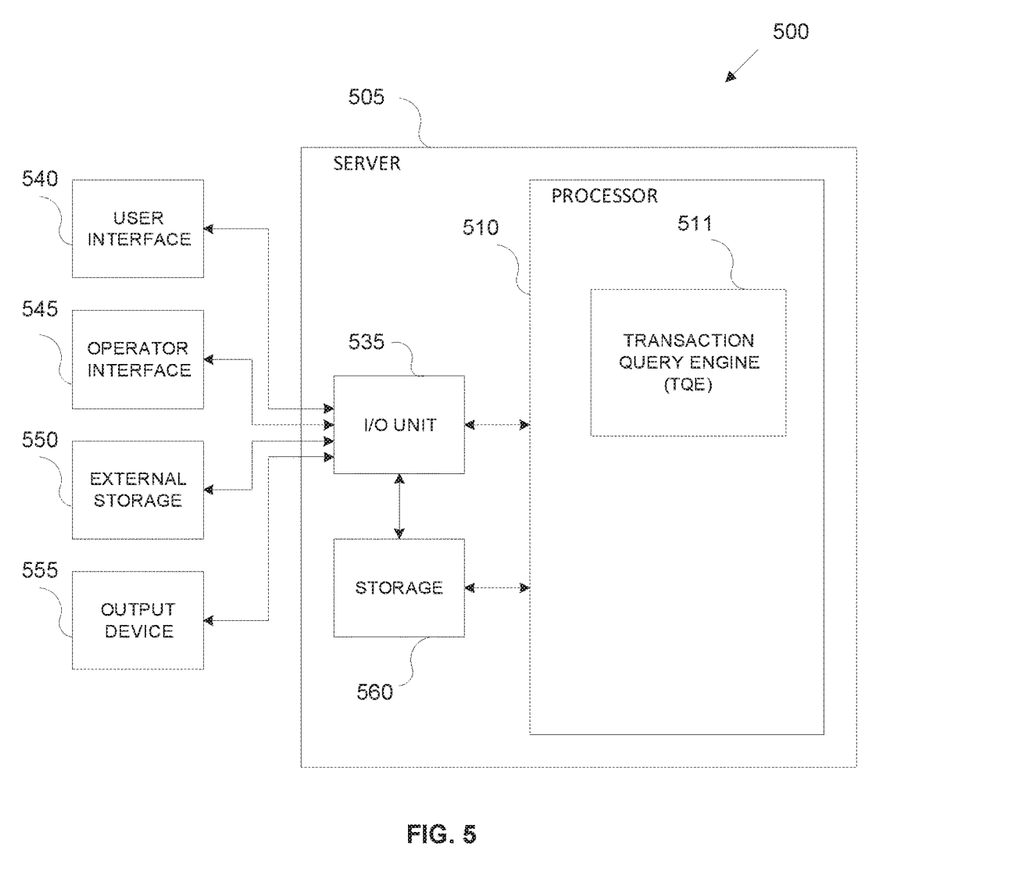
FIG. 5 illustrates an example computer server on which example implementations may be implemented.

FIG. 5 illustrates an example computer system 500 on which example implementations may be implemented. The computer system 500 includes a server 505 which may involve an I/O unit 535, storage 560, and a processor 510 operable to execute one or more units as known to one of skill in the art. The term "computer-readable medium" as used herein refers to any medium that participates in providing instructions to processor 510 for execution, which may come in the form of computer-readable storage mediums, such as, but not limited to optical disks, magnetic disks, read-only memories, random access memories, solid state devices and drives, or any other types of non-transitory or tangible media suitable for storing electronic information, or computer-readable signal mediums, which can include media such as carrier waves. The I/O unit processes input from user interfaces 540 and operator interfaces 545 which may utilize input devices such as a keyboard, mouse, touch device, or verbal command.

The server 505 may also be connected to an external storage 550, which can contain removable storage such as a storage system, portable hard drive, optical media (CD or DVD), disk media or any other medium from which a computer can read executable code. The server may also be connected an output device 555, such as a display to output data and other information to a user, as well as request additional information from a user. The connections from the server 505 to the user interface 540, the operator interface 545, the external storage 550, and the output device 555 may via wireless protocols, such as the 802.11 standards, Bluetooth® or cellular protocols, or via physical transmission media, such as cables or fiber optics. The output device 555 may therefore further act as an input device for interacting with a user.

Figure 6:
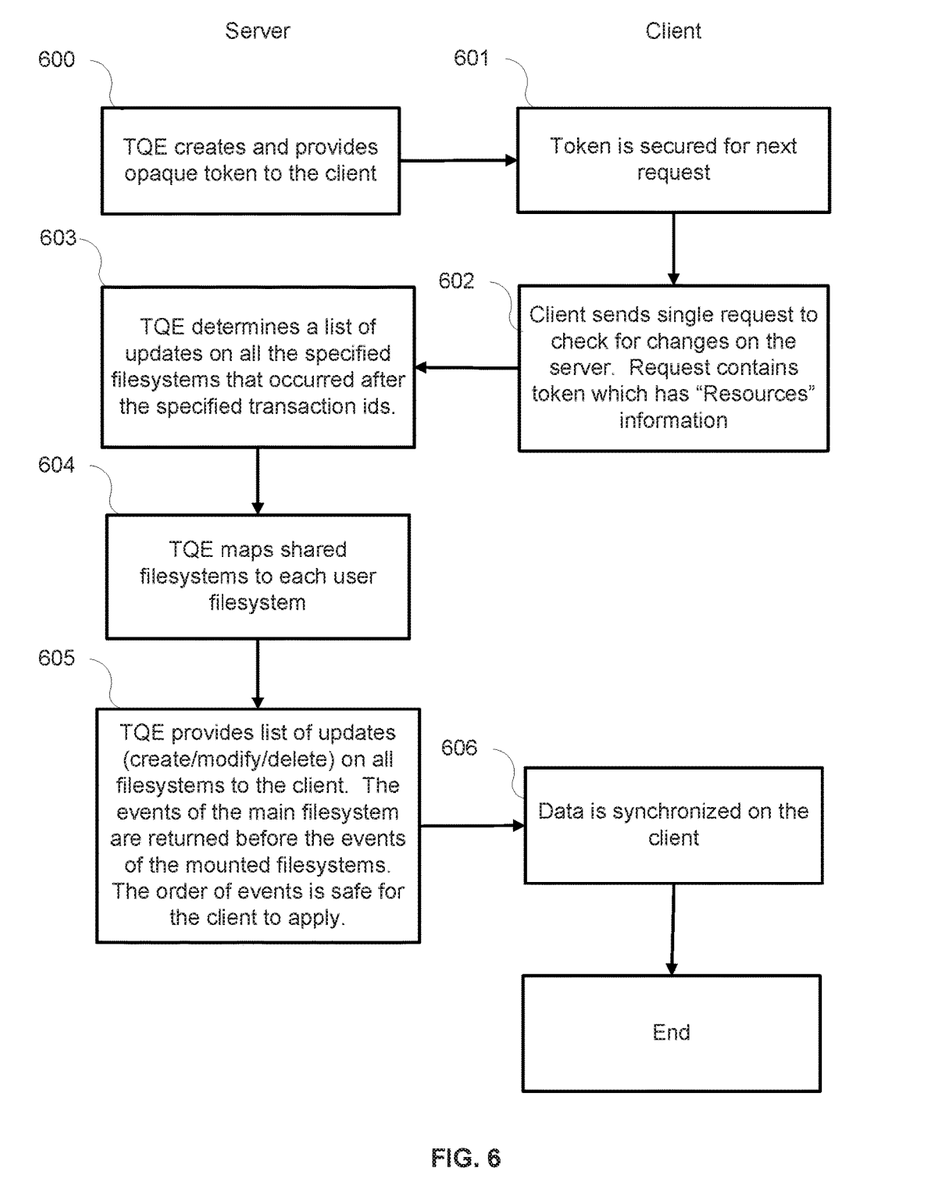
FIG. 6 is a flow diagram representing client request and token management in accordance with an example implementation.
Figure 7:
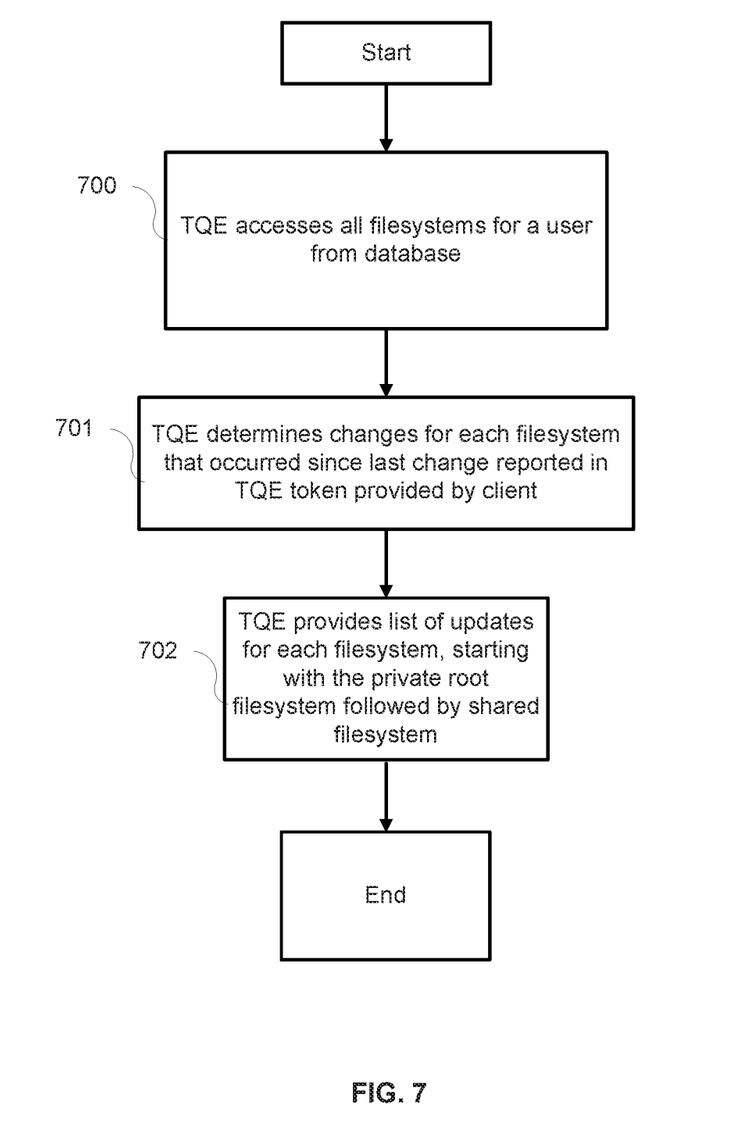
FIG. 7 illustrates a flow diagram for determining changes for a shared filesystem, in accordance with an example implementation.
Figure 8:
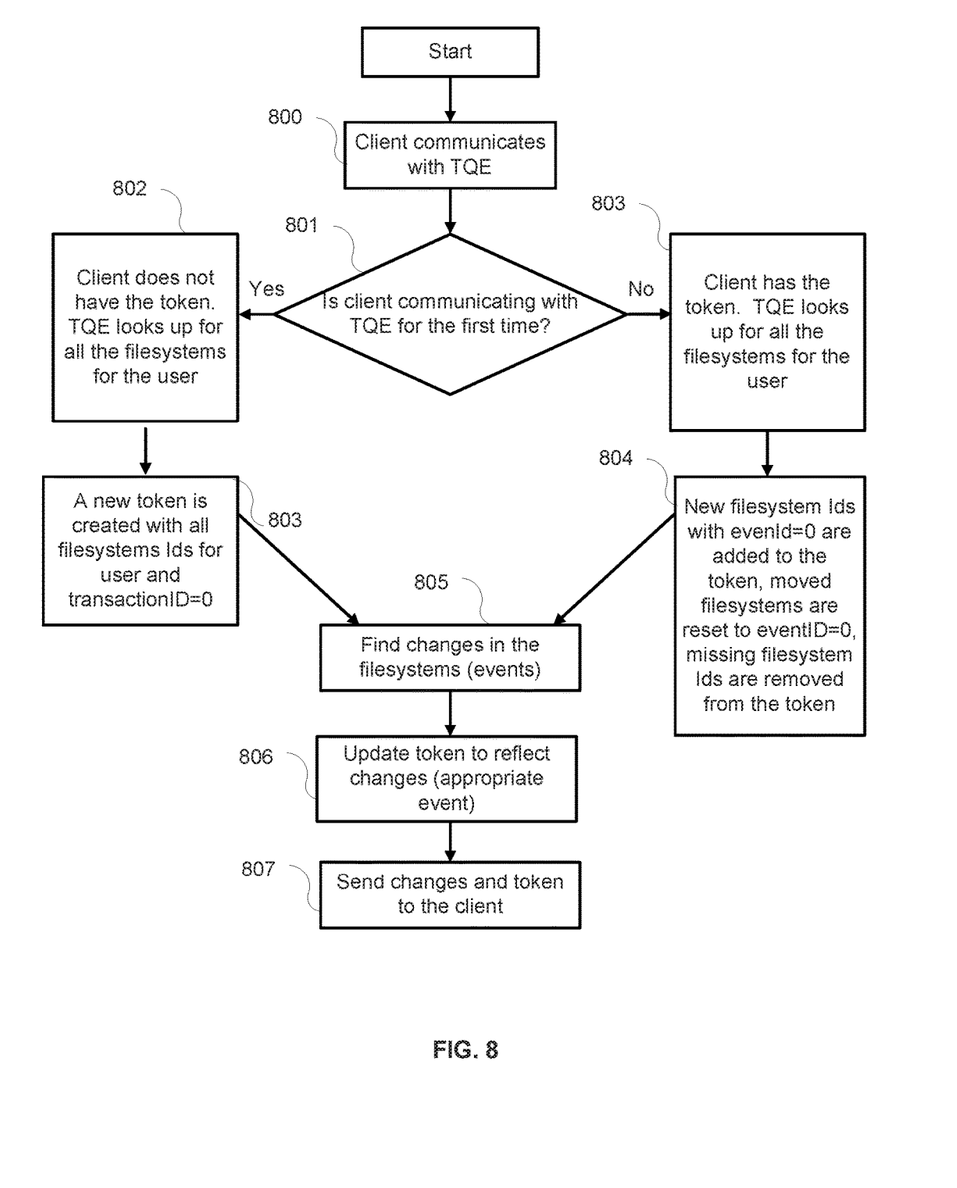
FIG. 8 illustrates a flow diagram for a token creation process, in accordance with an example implementation.

The processor 510 can be configured to facilitate one or more implementations as described, for example in FIGS. 6 to 8. Processor 510 may be configured to execute TQE 511. The TQE may be configured to generate or process tokens as described in greater detail in FIGS. 6 to 8. For example, the processor can be configured to process a token including transaction identifier information and mountpoint information as described above; update the token from the transaction information based on the transaction identifier information and the mountpoint information as described in FIGS. 6 to 8; and send the token to a corresponding client.

FIG. 6 is a flow diagram representing client request and token management in accordance with an example implementation. The Client sends a single request to check for changes on the server (600). The request contains a token which has "Resources" information which can encompass all of the filesystem IDs, mountpoints and transaction IDs. The TQE of the server determines a list of updates on all of the specified filesystems (e.g. specified by the filesystem identifier information) that occurred after the specified transaction IDs (601), which can involve traversing the transaction information managed by the server for the transactions occurring after the transaction IDs of the token. The TQE maps shared filesystems to the filesystem of each user (602) via updating the mountpoints of the token with the shared and private information of the server. The TQE may provide a list of updates (603) (e.g., create/modify/delete) on all file systems and an opaque token (604) to the client. The events of the filesystem can be returned before the events of the mounted filesystems, which can ensure a safe update order for the client. The data is then synchronized back to the client (605) and the token is secured for the next request.

FIG. 7 illustrates a flow diagram for determining changes for a shared filesystem, in accordance with an example implementation. The TQE accesses all of the filesystems for a user from the database (700). TQE determines changes for each file system that occurs since the last change reported in the token provided by the client (701). TQE then provides a list of updates for each file system, starting with the private information (e.g., private root filesystem) followed by the shared information (e.g., the shared filesystem) (702).

FIG. 8 illustrates a flow diagram for a token creation process, in accordance with an example implementation. The client communicates with the TQE (800), wherein the TQE determines if the client is communicating with the TQE for the first time (801). If so (Yes), then the client does not have the token, and the TQE conducts a lookup for all of the filesystems for the user (802). A new token is created with all the file systemIDs for the user and an eventID of zero (803) as no transactions have previously occurred for this client.

Otherwise (No) the client does have the token. The TQE therefore conducts a lookup for all the filesystems for the user (803) and new filesystem IDs with eventID of zero are added to the token (804). Moved filesystems are reset to eventID of zero and missing filesystem IDs are removed from the token. The eventID is set to zero as a transaction identifier indicating that the filesystem has changed and that the creation or movement thereof is the very first transaction fo the newly formed or moved filesystem.

After the processing above, the server may find changes in the filesystems (805). The changes can include events as described above, for example, in FIG. 6. The server then updates the token to reflect the changes (806), and sends the changes and the token to the client (807).

Finally, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A server comprising:
a memory configured to manage a private file system for a first user and a shared file system which is shared by a plurality of users including the first user, wherein the shared file system is pointed from the private file system;
a processor, configured to:
create a single token comprising first transaction information indicative of one or more transactions that occurred on the private file system and second transaction information indicative of one or more transactions that occurred on the shared file system;
send the single token to a client device corresponding to the first user; and
receive a request, which is created based on the single token by the client device and requests to obtain a combined transaction log comprising a first transaction log of the private file system and a second transaction log of the shared file system, from the client device;
wherein the first transaction information comprises a first file system identifier of the private file system, a first mount point of the private file system, and a first transaction ID associated with a transaction that is not reflected on data of the client device;
wherein the second transaction information comprises a second file system identifier of the shared file system, a second mount point of the shared file system, and a second transaction ID associated with a transaction that is not reflected on data of the client device.

2. The server of claim 1, wherein the processor is further configured to send the combined transaction log.

3. The server claim 1, wherein the memory is further configured to manage the combined transaction log as a combination of a first transaction log of the private file system and a second transaction log of the shared file system.

4. The server of claim 1, wherein the processor is further configured to create another single token that omits the second transaction information when the shared folder becomes unshared with the first user after creating the single token.

5. The server of claim 1,
wherein the memory is further configured to manage another shared file system which becomes shared with the first user after creating the single token;
wherein the processor is further configured to create another single token comprising third transaction information indicative of one or more transactions that occurred on the another shared file system.

6. A method, comprising:
managing a private file system for a first user and a shared file system which is shared by a plurality of users including the first user, wherein the shared file system is pointed from the private file system;
creating a single token comprising first transaction information indicative of one or more transactions that occurred on the private file system and second transaction information indicative of one or more transactions that occurred on the shared file system;
sending the single token to a client device corresponding to the first user; and
receiving a request, which is created based on the single token by the client device and requests to obtain a combined transaction log which includes a first transaction of the private file system and a second transaction log of the shared file system, from the client device;
wherein the first transaction information comprises a first file system identifier of the private file system, a first mount point of the private file system, and a first transaction ID associated with a transaction that is not reflected on data of the client device;
wherein the second transaction information comprises a second file system identifier of the shared file system, a second mount point of the shared file system, and a second transaction ID associated with a transaction that is not reflected on data of the client device.

7. The method of claim 6, further comprising sending the combined transaction log.

8. The method of claim 6, further comprising managing the combined transaction log as a combination of a first transaction log of the private file system and a second transaction log of the shared file system.

9. The method of claim 6, further comprising creating another single token that omits the second transaction information when the shared folder becomes unshared with the first user after creating the single token.

10. The method of claim 6, further comprising:
managing another shared file system which becomes shared with the first user after creating the single token; and
creating another single token comprising third transaction information indicative of one or more transactions that occurred on the another shared file system.

* * * * *